United States Patent
Gao et al.

(10) Patent No.: US 11,417,009 B2
(45) Date of Patent: *Aug. 16, 2022

(54) SYSTEMS AND METHODS FOR OBJECT MEASUREMENT

(71) Applicant: KAYAK Software Corporation, Stamford, CT (US)

(72) Inventors: Kaijian Gao, Boston, MA (US); Trevor Glenn Elkins, Watertown, MA (US); Lauren Anne Ko, Somerville, MA (US); Rebecca Chen, Cambridge, MA (US); Giorgos C. Zacharia, Winchester, MA (US)

(73) Assignee: Kayak Software Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/107,325

(22) Filed: Nov. 30, 2020

(65) Prior Publication Data

US 2021/0090282 A1 Mar. 25, 2021

Related U.S. Application Data

(63) Continuation of application No. 16/186,074, filed on Nov. 9, 2018, now Pat. No. 10,885,655.

(Continued)

(51) Int. Cl.
*G06T 7/62* (2017.01)
*G01B 11/02* (2006.01)
(Continued)

(52) U.S. Cl.
CPC .............. *G06T 7/62* (2017.01); *G01B 11/022* (2013.01); *G06V 20/20* (2022.01); *G06V 30/142* (2022.01)

(58) Field of Classification Search
CPC ... G06T 7/62; G06T 2207/30112; G06T 7/60; G06K 9/00671
See application file for complete search history.

(56) References Cited

U.S. PATENT DOCUMENTS 5,513,309 A * 4/1996 Meier ................. G06F 3/04845
345/179
9,384,417 B1 * 7/2016 Domanski .............. G06V 10/60
(Continued)

OTHER PUBLICATIONS

KLM's New App Feature Tells You When Your Carry-On Luggage is Too Big, https://thepointsguy.com/news/klms-new-app-feature-tells-you-when-your-suitcase-is-too . . . , Sep. 12, 2018, pp. 1-16.‡
(Continued)

*Primary Examiner* — King Y Poon
*Assistant Examiner* — Michael L Burleson
(74) *Attorney, Agent, or Firm* — Fish & Richardson P.C.

(57) ABSTRACT

Systems and methods for object measurement in accordance with aspects of the disclosure are described. One embodiment of the invention includes a system including a processor, a memory in communication with the processor, an input device, and an image capture device, wherein the processor obtains image data using the image capture device in response to input received from the input device indicating that image data should be captured, identifies a set of feature points within the obtained image data, completes the obtaining of the image data based on the set of feature points identified and in response to input received from the input device indicating that image data should no longer be captured, generates a model based on the set of feature points, measures the generated model with respect to a reference plane, and provides an indication of the measured size of the generated model.

20 Claims, 21 Drawing Sheets

Related U.S. Application Data

(60) Provisional application No. 62/721,092, filed on Aug. 22, 2018.

(51) Int. Cl.
  *G06V 20/20* (2022.01)
  *G06V 30/142* (2022.01)

(56) References Cited

U.S. PATENT DOCUMENTS

| | | | |
|---|---|---|---|
| 10,217,286 B1* | 2/2019 | Angel | G06V 20/59 |
| 10,460,464 B1* | 10/2019 | Hasan | G06F 16/951 |
| 10,885,655 B2 | 1/2021 | Gao et al. | |
| 2008/0094489 A1* | 4/2008 | Takamoto | H04N 5/361 |
| | | | 348/241 |
| 2010/0310232 A1* | 12/2010 | Iwase | H04N 5/23216 |
| | | | 386/290 |
| 2016/0196665 A1* | 7/2016 | Abreu | G06T 7/251 |
| | | | 345/427 |
| 2016/0259544 A1* | 9/2016 | Polikarpov | G06F 3/04886 |
| 2017/0230641 A1* | 8/2017 | Scavezze | H04N 13/239 |
| 2020/0065988 A1 | 2/2020 | Gao et al. | |

OTHER PUBLICATIONS

How ARKit could save you at the airport—code.kiwi.com, https://code.kiwi.com/how-arkit-can-save-you-at-the-airport-dbb01f3cdeba, May 9, 2018, pp. 1-14.‡

Southwest App Tells You If Your Bag Fits in Overhead Bin, https://thepointsguy.com/news/this-southwest-app-tells-you-if-your-bag-fits-in-the-overh . . . , Nov. 12, 2018, pp. 1-7.‡

LATAM Set to Launch Augmented Reality Tool That Measures Carry-On Luggage, https://apex.aero/2018/09/11/latam-augumented-reality-measure-carryon-luggage, Sep. 12, 2018, pp. 1-2.‡

\* cited by examiner
‡ imported from a related application

SYSTEMS AND METHODS FOR OBJECT MEASUREMENT

CROSS-REFERENCE TO RELATED APPLICATIONS

The instant application claims priority to U.S. patent application Ser. No. 16/186,074, titled "Systems and Methods for Object Measurement" and filed Nov. 9, 2018, which claims priority to U.S. Provisional Patent Application No. 62/721,092, filed Aug. 22, 2018, the disclosures of which are hereby incorporated by reference in their entirety.

FIELD OF THE INVENTION

The disclosures herein are generally directed to image processing and more specifically to the identification of objects in images.

BACKGROUND

When traveling, travelers are typically allowed a carry-on bag plus one personal item. Carry-on bags are typically constrained by size and weight limits due to the limited space available in the overhead storage of an aircraft.

SUMMARY

The following presents a simplified summary in order to provide a basic understanding of the disclosures herein. The summary is not an extensive overview of the disclosure. It is intended neither to identify key or critical elements of the disclosure nor to delineate the scope of the disclosure. The following summary merely presents some concepts of the disclosure in a simplified form as a prelude to the description below.

Systems and methods for object measurement in accordance with aspects of the disclosure are described. One embodiment of the invention includes a system including a processor, a memory in communication with the processor, an input device, and an image capture device, wherein the processor obtains image data using the image capture device in response to input received from the input device indicating that image data should be captured, identifies a set of feature points within the obtained image data, completes the obtaining of the image data based on the set of feature points identified and in response to input received from the input device indicating that image data should no longer be captured, generates a model based on the set of feature points, measures the generated model with respect to a reference plane, and provides an indication of the measured size of the generated model.

In yet another additional embodiment of the invention, the processor further identifies the reference plane prior to obtaining the image data using the image capture device.

In still another additional embodiment of the invention, the processor further automatically identifies the reference plane based on the obtained image data and the set of feature points.

In yet still another additional embodiment of the invention, the input device includes a touch screen.

In yet another embodiment of the invention, the input device includes displaying a scan button including a trigger area response to a touch input and a visual indication of the number of feature points identified.

In still another embodiment of the invention, the image capture device includes a two dimensional image sensor.

In yet still another embodiment of the invention, the generated model includes a bounding box of an object captured in the image data calculated based on the set of feature points.

Yet another embodiment of the invention includes a method including obtaining image data using a device including a processor and a memory in communication with the processor, identifying a set of feature points within the obtained image data using the device, completing the obtaining of the image data based on the set of feature points identified and in response to an indication that image data should no longer be captured using the device, generating a model based on the set of feature points using the device, measuring the generated model with respect to a reference plane using the device, and providing an indication of the measured size of the generated model using the device.

In yet another additional embodiment of the invention, the method further includes identifying the reference plane prior to obtaining the image data using the device.

In still another additional embodiment of the invention, the method further includes automatically identifying the reference plane based on the obtained image data and the set of feature points using the device.

In yet still another additional embodiment of the invention, the device further includes a touch screen.

In yet another embodiment of the invention, the method further includes displaying, using the touch screen of the device, a scan button including a trigger area response to a touch input and a visual indication of the number of feature points identified.

In still another embodiment of the invention, the device includes a two dimensional image sensor.

In yet still another embodiment of the invention, the method further includes generating the model by calculating a bounding box of an object captured in the image data calculated based on the set of feature points using the device.

Still another embodiment of the invention includes a non-transitory computer-readable medium storing instructions for controlling a processor, the instructions causing the processor to perform steps including obtaining image data, identifying a set of feature points within the obtained image data, completing the obtaining of the image data based on the set of feature points identified and in response to an indication that image data should no longer be captured, generating a model based on the set of feature points, measuring the generated model with respect to a reference plane, and providing an indication of the measured size of the generated model.

In yet another additional embodiment of the invention, the instructions further cause the processor to perform steps including identifying the reference plane prior to obtaining the image data.

In still another additional embodiment of the invention, the instructions further cause the processor to perform steps including automatically identifying the reference plane based on the obtained image data and the set of feature points.

In yet still another additional embodiment of the invention, the processor is in communication with a touch screen.

In yet another embodiment of the invention, the instructions further cause the processor to perform steps including displaying, using the touch screen, a scan button including a trigger area response to a touch input and a visual indication of the number of feature points identified.

In still another embodiment of the invention, the instructions further cause the processor to perform steps including generating the model by calculating a bounding box of an object captured in the image data calculated based on the set of feature points.

Yet another embodiment of the invention includes a system, including a processor, a memory in communication with the processor and storing instructions, an input device, and an image capture device, wherein the instructions, when read by the processor, cause the system to obtain image data using the image capture device in response to input received from the input device indicating that image data should be captured, identify a set of feature points within the obtained image data, complete the obtaining of the image data based on the set of feature points identified and in response to input received from the input device indicating that image data should no longer be captured, generate a model based on the set of feature points, measure the generated model with respect to a reference plane to calculate a measured size of the generated model, and provide an indication of the measured size of the generated model.

In yet another embodiment of the invention, the instructions, when read by the processor, further cause the system to identify the reference plane prior to obtaining the image data using the image capture device.

In still another embodiment of the invention, the instructions, when read by the processor, further cause the system to automatically identify the reference plane based on the obtained image data and the set of feature points.

In yet still another embodiment of the invention, the input device includes a touch screen.

In yet another additional embodiment of the invention, the input device includes displaying a scan button including a trigger area response to a touch input and a visual indication of the set of feature points identified.

In still another additional embodiment of the invention, the image capture device includes a two dimensional image sensor.

In yet still another additional embodiment of the invention, the instructions, when read by the processor, further cause the system to calculate an image sensor correction value based on the image capture device and the obtained image data and generate the model based on the set of feature points and the image sensor correction value.

Still another embodiment of the invention includes a method including obtaining image data using a device including a processor and a memory in communication with the processor, identifying a set of feature points within the obtained image data using the device, completing the obtaining of the image data based on the set of feature points identified and in response to an indication that image data should no longer be captured using the device, generating a model based on the set of feature points using the device, measuring the generated model with respect to a reference plane using the device, and providing an indication of the measured size of the generated model using the device.

In yet another embodiment of the invention, the method further includes identifying the reference plane prior to obtaining the image data using the device.

In still another embodiment of the invention, the method further includes automatically identifying the reference plane based on the obtained image data and the set of feature points using the device.

In yet still another embodiment of the invention, the device further includes a touch screen.

In yet another additional embodiment of the invention, the method further includes displaying, using the touch screen of the device, a scan button including a trigger area response to a touch input and a visual indication of the set of feature points identified.

In still another additional embodiment of the invention, the device includes a two dimensional image sensor.

In yet still another additional embodiment of the invention, the method further includes calculating, by the device, an image sensor correction value based on the image capture device and the obtained image data and generating, by the device, the model based on the set of feature points and the image sensor correction value.

Yet another embodiment of the invention includes a non-transitory computer-readable medium storing instructions for controlling a processor, the instructions causing the processor to perform steps including obtaining image data, identifying a set of feature points within the obtained image data, completing the obtaining of the image data based on the set of feature points identified and in response to an indication that image data should no longer be captured, generating a model based on the set of feature points, measuring the generated model with respect to a reference plane, and providing an indication of the measured size of the generated model.

In yet another embodiment of the invention, the instructions further cause the processor to perform steps including identifying the reference plane prior to obtaining the image data.

In still another embodiment of the invention, the instructions further cause the processor to perform steps including automatically identifying the reference plane based on the obtained image data and the set of feature points.

In yet still another embodiment of the invention, the processor is in communication with a touch screen.

In yet another additional embodiment of the invention, the instructions further cause the processor to perform steps including displaying, using the touch screen, a scan button including a trigger area response to a touch input and a visual indication of the set of feature points identified.

In still another additional embodiment of the invention, the instructions further cause the processor to perform steps including calculating an image sensor correction value based on the image capture device and the obtained image data and generating the model based on the set of feature points and the image sensor correction value.

Other objects, advantages and novel features, and further scope of applicability of the present invention will be set forth in part in the detailed description to follow, and in part will become apparent to those skilled in the art upon examination of the following, or can be learned by practice of the invention. The objects and advantages of the invention can be realized and attained by means of the instrumentalities and combinations particularly pointed out in the claims.

BRIEF DESCRIPTION OF THE DRAWINGS

Some features herein are illustrated by way of example, and not by way of limitation, in the accompanying drawings. In the drawings, like numerals reference similar elements between the drawings.

DETAILED DESCRIPTION

Turning now to the drawings, systems and methods for the measurement of objects in accordance with embodiments of the invention are shown.

Many travelers bring carry-on luggage when traveling via aircraft. This carry-on luggage is typically stored in overhead storage of the aircraft and is subject to specific size and/or weight requirements. Traditionally, travelers are required to have advance knowledge of the carry-on bag requirements for each airline along with specific knowledge of the size of their bag. If the traveler's carry-on exceeds the maximum allowed bag size, it is likely that the airline will require the traveler to check their bag, leading to delays in leaving the airport and introducing the risk of the airline losing their carry-on during transit. Further complicating matters, different aircraft employed by the same airline can have different sized overhead storage, such that a bag that will fit on some planes of an airline will not fit in other planes operated by the same airline.

Travel service systems in accordance with embodiments of the invention allow travelers to automatically calculate the size of their bags (or any other object) and compare the size of their bag to the allowed baggage size for a particular airline. In a number of embodiments, the allowed baggage size is determined automatically by obtaining planned trips to determine on which airline and/or which aircraft the traveler will be traveling.

Travel Service Systems

Figure 1:
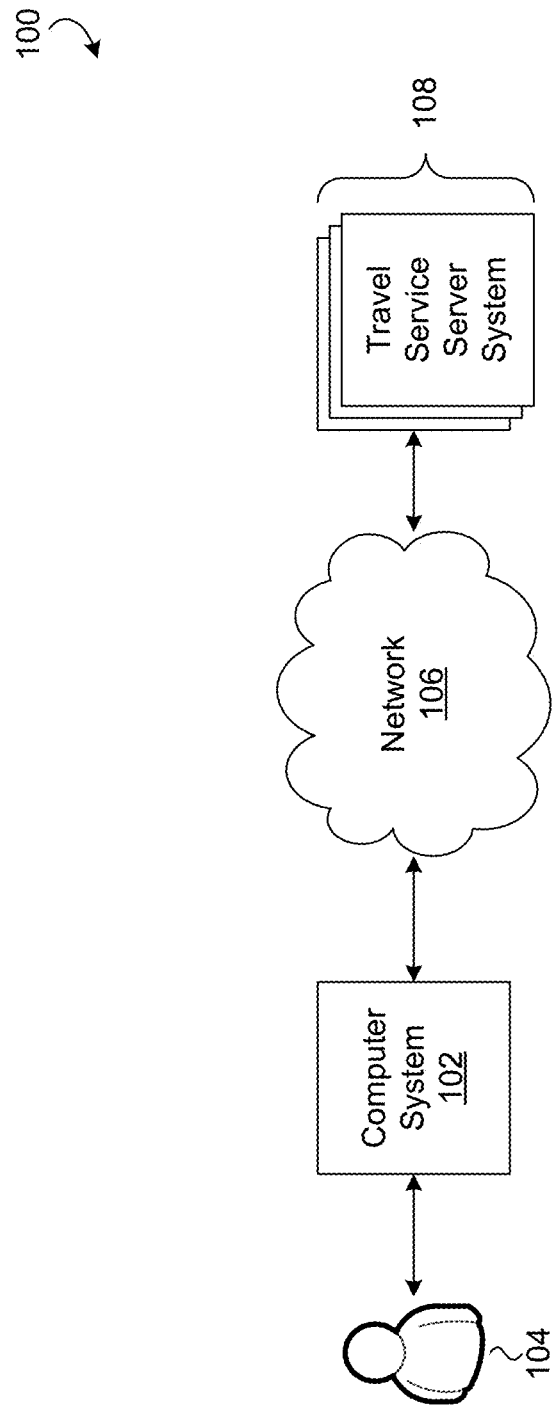
FIG. 1 is a conceptual illustration of a travel service system in accordance with an embodiment of the invention.

Turning now to FIG. 1, components of an example travel service system 100 is shown. The travel service system 100 is a networked system by which a user can obtain, among other travel-related information, travel information for the user and/or the size of particular objects, such as the user's luggage. The travel service system 100 can provide other travel-related services such as flight search services, flight booking services, lodging search and/or booking services, and/or vehicle rental search services and vehicle rental booking services. The travel service system 100 includes a computer system 102 associated with a user 104. The user's computer system 102 can be any network-enabled device configured to access and exchange communications via a network 106. Example computer systems include workstations, desktop computers, laptop computers, tablet computers, computer terminals, kiosks, microconsoles, mobile telephones (e.g., "smartphones," "feature phones"), portable media players, personal digital assistants (PDA), video game consoles, set-top boxes, "smart" televisions, "smart" watches, "smart" speakers, e-book readers, in-vehicle navigation devices, in-vehicle entertainment devices, and the like. The network 106 can include one or more wired or wireless networks such as, for example, private networks, public networks, the Internet, cellular networks, local area networks (LANs), wide area networks (WANs), and the like.

In a variety of embodiments, the travel service system 100 includes a travel service server system 108. The travel service server system 108 can include one or more computing devices such as servers, data storage devices, and the like. The travel service server system 108 can be implemented and operated by a travel search service provider such as Kayak.com. The travel search service system 108 can also be configured to perform flight search queries, lodging queries, and/or vehicle rental search queries on behalf of the user 104. In many embodiments, the computer system 102 and/or travel service server system 108 are capable of performing a variety of object measurement processes, either alone or in combination. In this way, the object measurement processes can be performed directly on the computer system 102, travel service server system 108, and/or a combination of devices as appropriate to the requirements of specific applications of embodiments of the invention.

To receive data from the user 104 and to provide data to the user 104, the computer system 102 and the travel service server system 108 exchange various communications via the network 106. Any of a variety of application programming interfaces (APIs) can be utilized in the transmission of data within the travel service system 100. The APIs can define the format and content of data that can be exchanged. In a number of embodiments, data can be formatted using an extensible markup language (XML) and transmitted via the network 106 in Hypertext Transfer Protocol (HTTP) requests/responses.

Object Measurement

Object measurement processes in accordance with embodiments of the invention include identifying one or more feature points of an object and/or calculating the dimensions (length, width, and/or height) of that object. Objects can be detected in a variety of data, such as one or more pieces of still image data, video data, and/or a combination of still and moving images, which captures a scene. In a variety of embodiments, additional sensor data can be combined with the image data to determine object boundaries within the scene. In many embodiments, a reference plane is identified within the scene. The reference plane can be utilized to establish a reference location for identifying objects within the image data. In several embodiments, the reference plane is utilized to measure the height of the object and/or distinguish useful feature points from erroneous ones. Feature points can be identified by scanning an object, such as with a camera, image sensor, or any other sensor described herein. These feature points can be filtered, combined, and/or otherwise processed to determine a final set of feature points utilized to define the boundaries of the object. In a number of embodiments, a real-time visualization of the feature points can be displayed to help a user understand how the bag is being measured. In several embodiments, model data can be generated based on the reference plane and the feature points. Models can include bounding boxes, bounding spheres, a tessellation of the detected surface, and/or any other model of the physical object as appropriate to the requirements of specific applications of embodiments of the invention. In a variety of embodiments, the model is the minimum sized object that include all of the feature points and the reference plane. The model can then be measured to determine the (approximate) dimensions of the detected object. The dimensions can then be compared to a data store of allowable object sizes. Any of a variety of data stores, including databases, can be utilized as appropriate to the requirements of specific applications of the invention. In many embodiments, this data store includes a set of airlines with dimension requirements for carry-on bags for each airline. In a number of embodiments, location data can be obtained from any of a variety of sources, such as a location determination device and/or trip data obtained from a travel service system, to identify the type of aircraft and/or airline. The determined dimensions can be along any of a length, width, height, or a combination of the total dimensions as appropriate to the requirements of specific applications of embodiments of the invention. The object may be measured in any orientation. In this way, an accurate recommendation regarding the allowability of the object can be provided.

In a variety of embodiments, machine learning algorithms can be utilized to identify feature vectors within the captured image data and/or to calculate the size of the detected objects. In several embodiments, a confidence metric can be associated with one or more of the feature points, the bounding box, and/or the measured object dimensions. In several embodiments, a computing device provides an API that provides image sensor-independent image data, reference planes, and/or detected features. In this way, variances between image sensors can be compensated for and the accuracy of the measurement of the object and/or model can be improved.

Figure 2A:
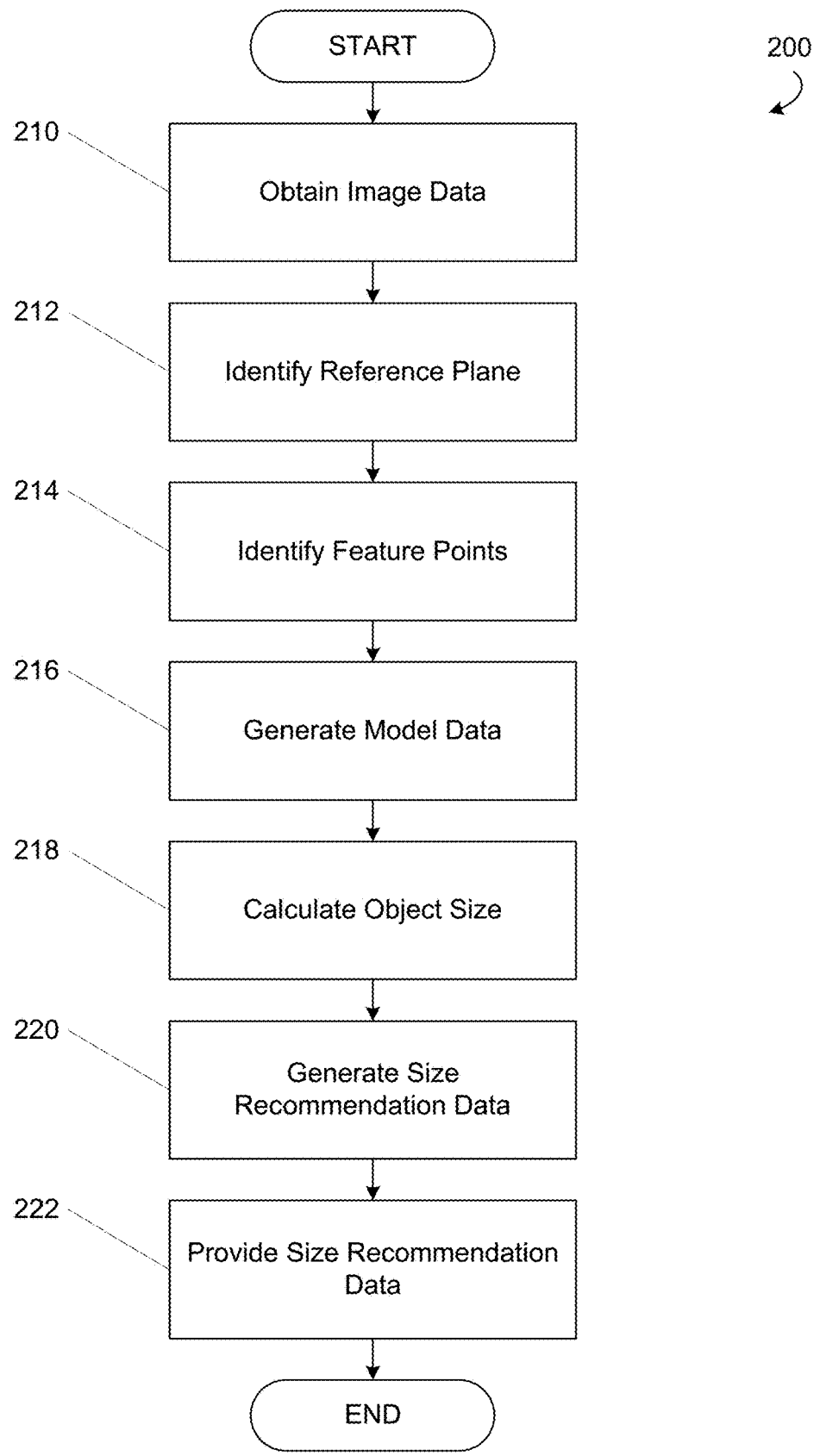
FIG. 2A is a flow chart illustrating a process for measuring an object in accordance with an embodiment of the invention.

Turning now to FIG. 2A, a process for measuring an object in accordance with an embodiment of the invention is shown. The process 200 includes obtaining (210) image data, identifying (212) a reference plane, identifying (214) feature points, generating (216) a model, and calculating (218) an object size. Size recommendation data is generated (220) and provided (222).

In a variety of embodiments, an object can be scanned without first identifying a reference plane. The scanning may be triggered based on the distance between the image sensor and the object being scanned. Based on the feature points identified during the scanning, a reference plane can be identified in concert with the generation of the object model. In order to determine if a reference plane is successfully identified, one or more error checks can be performed. First, the relative height of the feature points corresponding to the reference plane are compared to the feature points corresponding to the object. When the feature plane is determined to be higher than the object, the top of the object (or other non-reference plane surface) has been erroneously recognized as the reference plane. Additionally, the distance between the reference plane and the top of the object can be measured. If the distance between the reference plane and the top of the object exceeds a threshold value, it can be determined that the reference plane and/or the object has not been accurately modeled. The threshold distance can be pre-determined and/or determined dynamically based on the expected dimensions of the object. For example, carry-on luggage for airline travel is typically has a maximum height of around 20-22". If the detected object is carry-on luggage, a threshold height can be set at 24" and any objected detected that has a height exceeding this threshold could be indicative of an error in the determination of the reference plane. In a variety of embodiments, the reference place may be a threshold distance (such as 10 centimeters) away from the highest feature point identified for the object. If a valid reference plane is identified during the scan, it can be utilized in the calculation of the size of the object. If a valid reference plane is not identified, a reference plane can be manually identified as described herein.

Figure 2B:
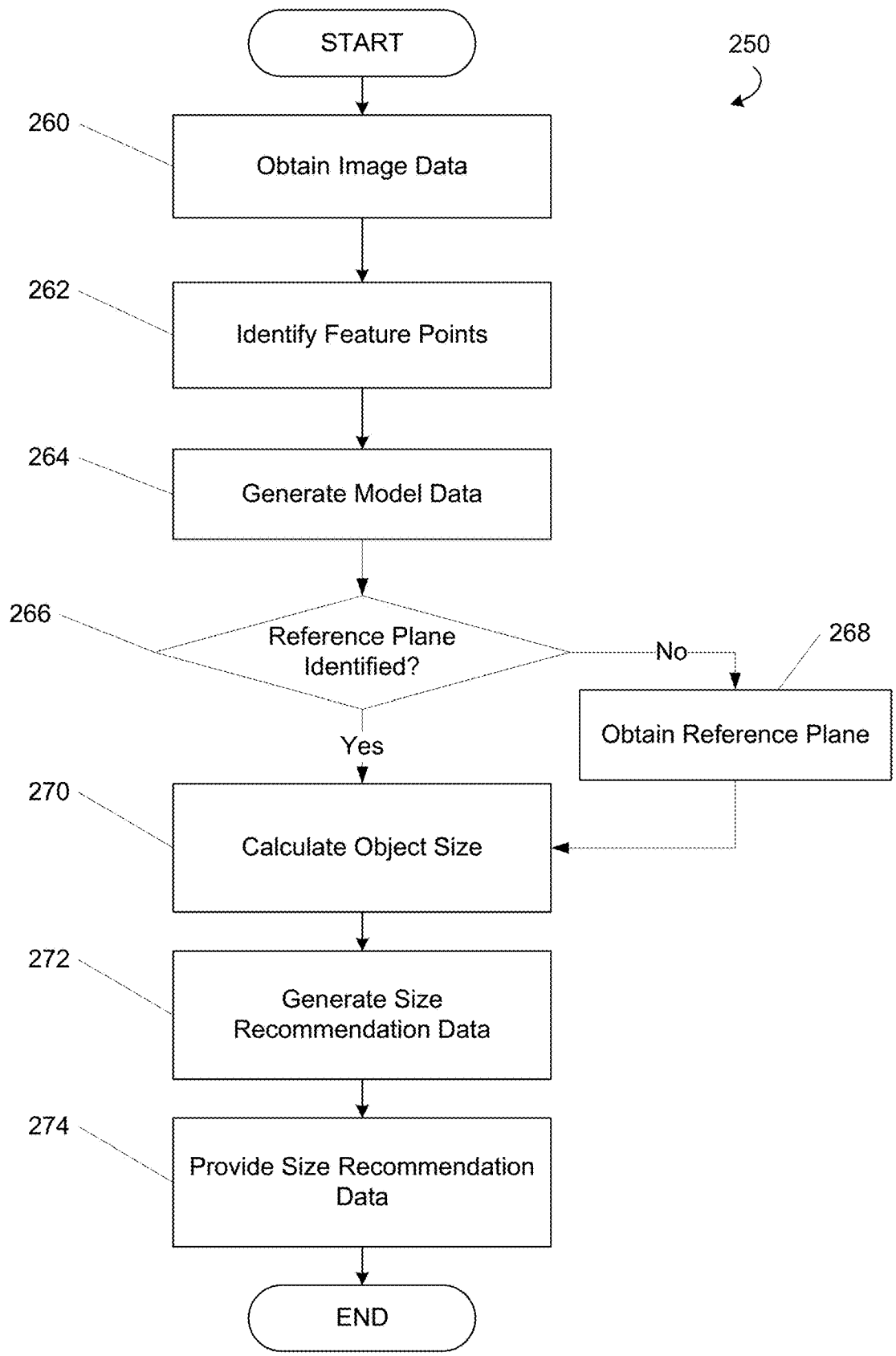
FIG. 2B is a flow chart illustrating a process for measuring an object with automatic determination of a ground plane in accordance with an embodiment of the invention.

Turning now to FIG. 2B, a process for measuring an object with automatic determination of a ground plane in accordance with an embodiment of the invention is shown. The process 250 includes obtaining (260) image data, identifying (262) feature points, generating (264) a model, and determining if a reference plane is identified (266). If a reference plane has not been identified (266), a reference plane can be obtained (268). If a reference plane has been identified (266) or obtained (268), an object size can be calculated (270). Size recommendation data can be generated (272) and provided (274).

Although specific processes are described for measuring objects and providing size recommendations are described with respect to FIGS. 2A-B, it should be noted that any of a variety of processes, including those that utilize intermediate objects other than bounding boxes to approximate the scanned object, can be utilized in accordance with many embodiments of the invention.

User Interfaces

Figure 3A:
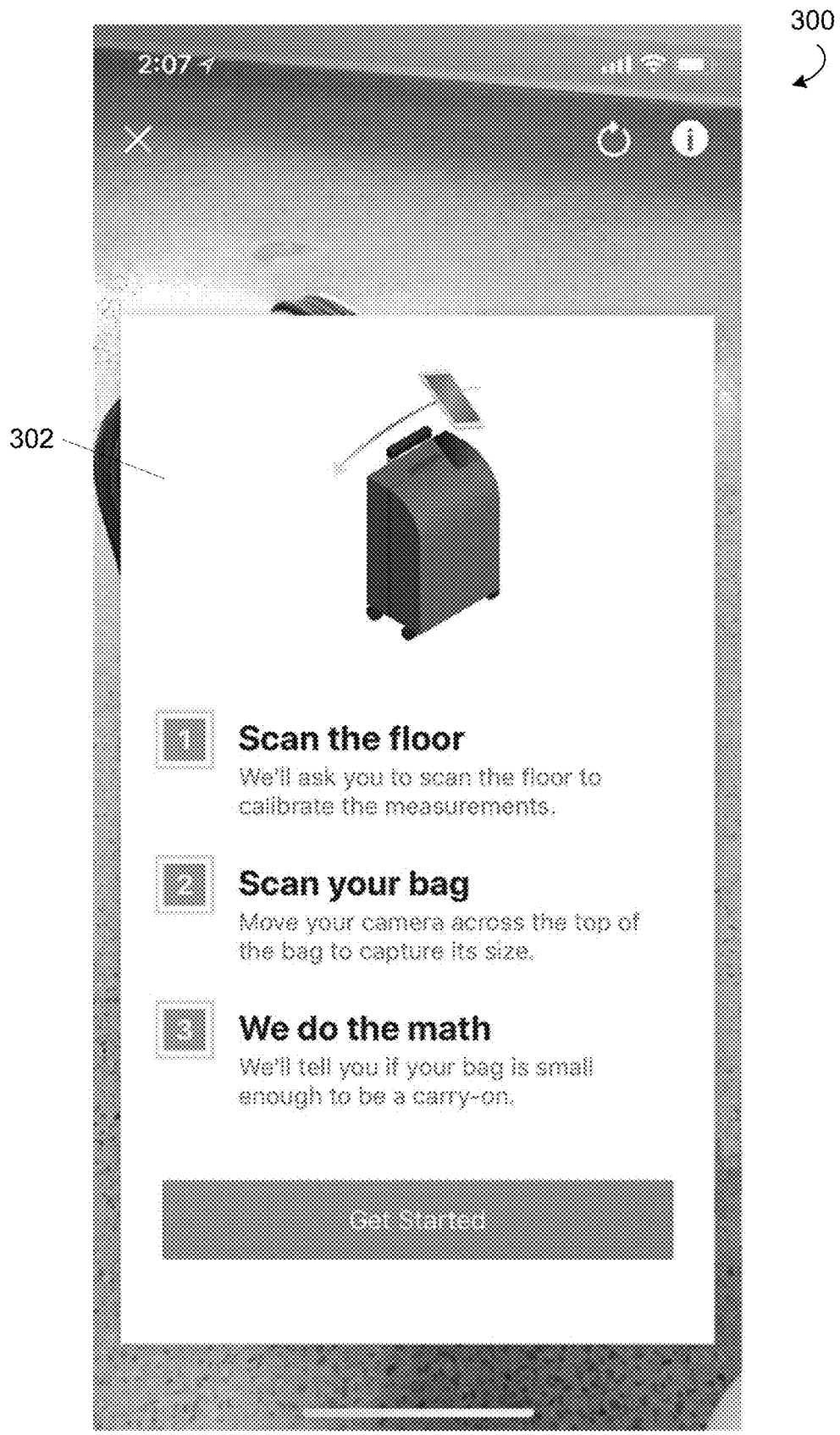
FIGS. 3A-Q are user interface screenshots for measuring an object in accordance with a variety of embodiments of the invention.
Figure 3B:
Figure 3C:
Figure 3D:
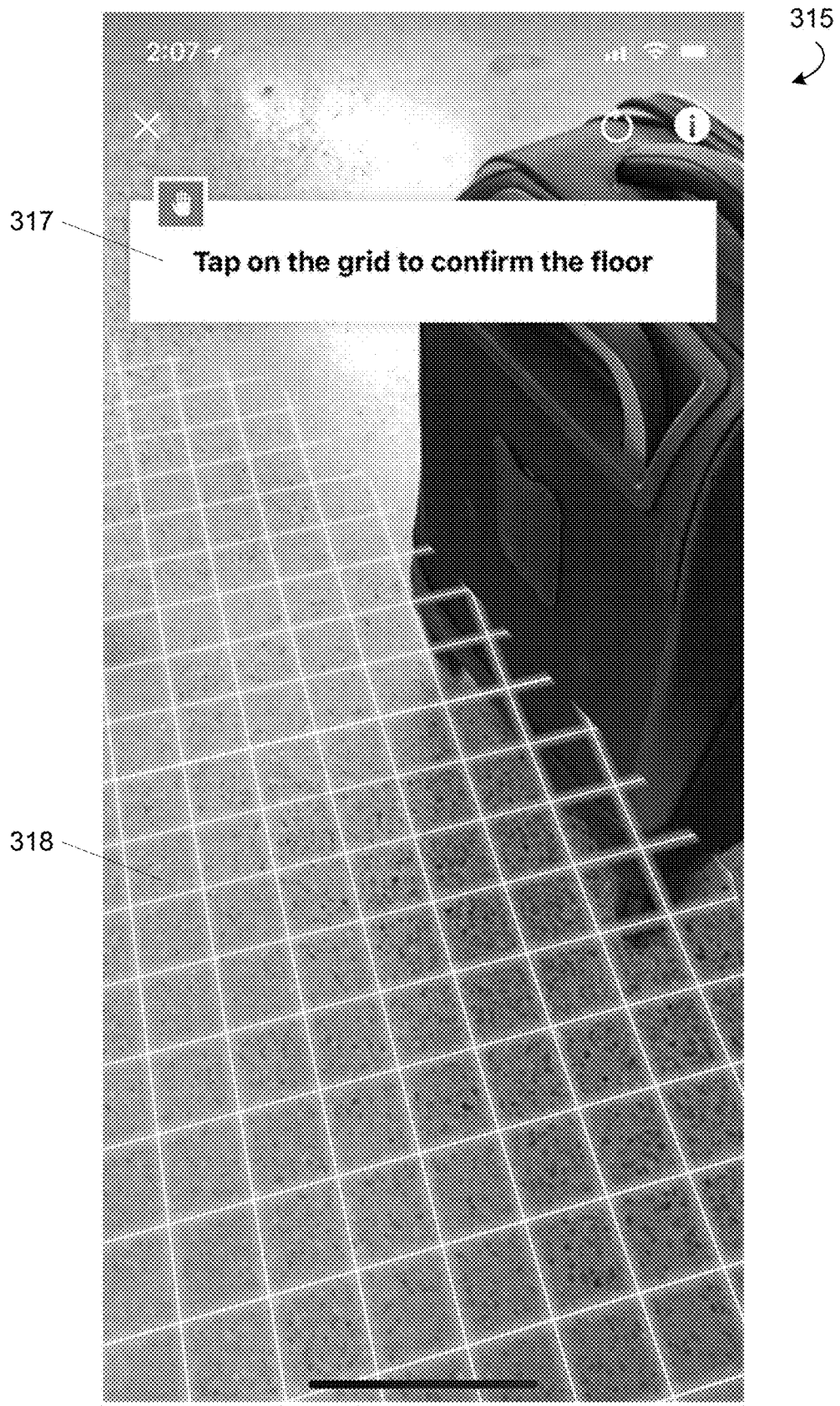
Figure 3E:
Figure 3F:
Figure 3G:
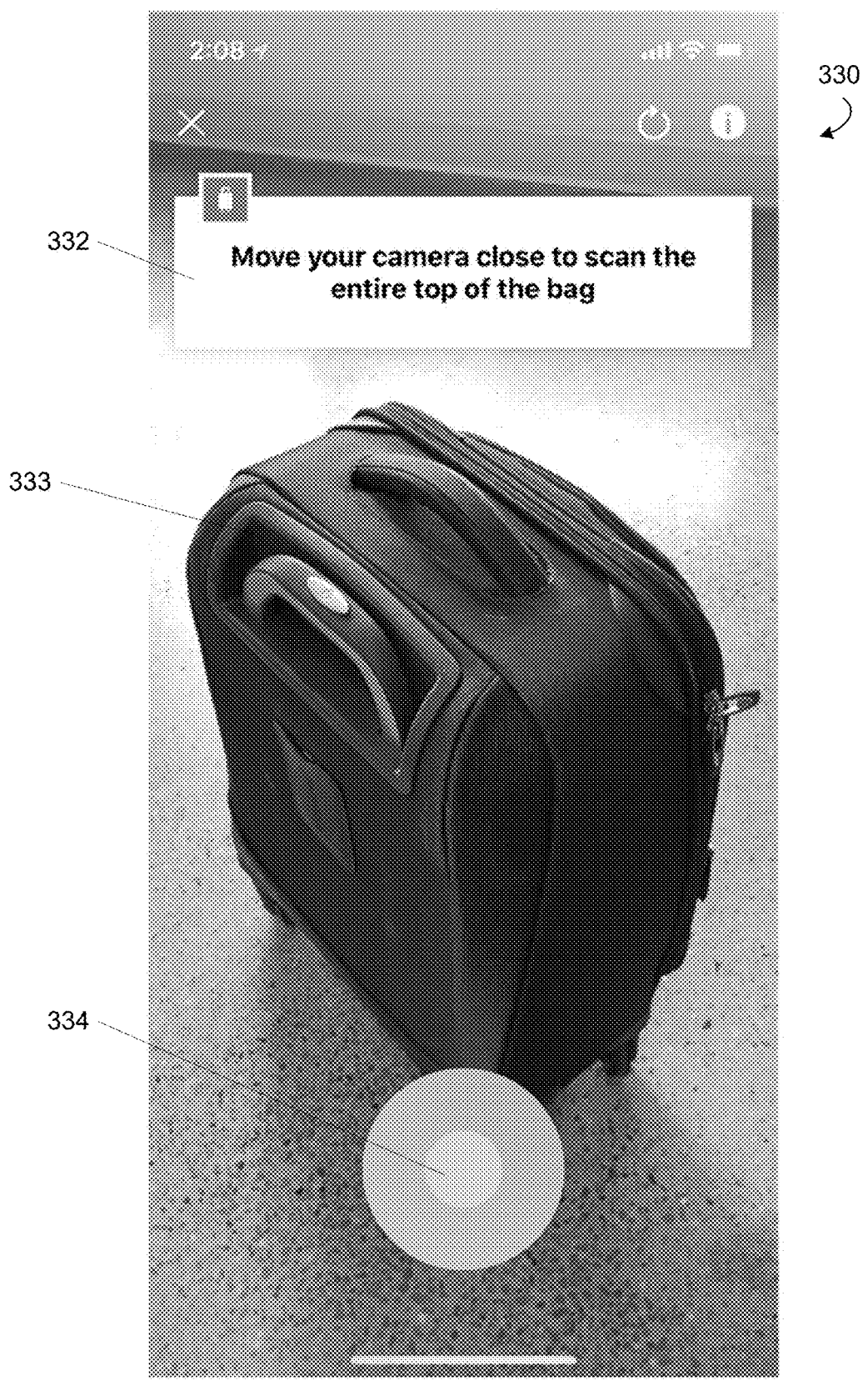
Figure 3H:
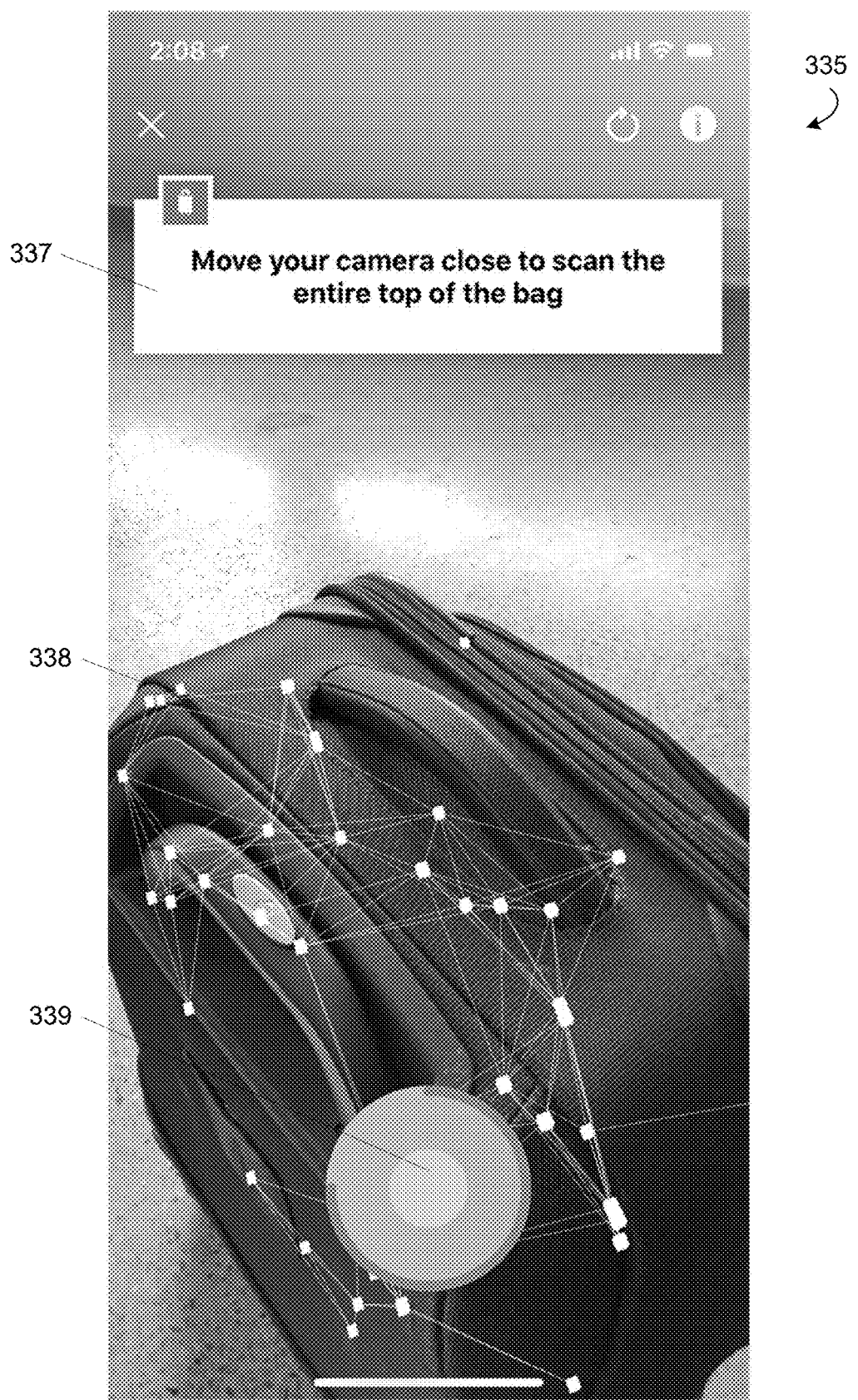
Figure 3I:
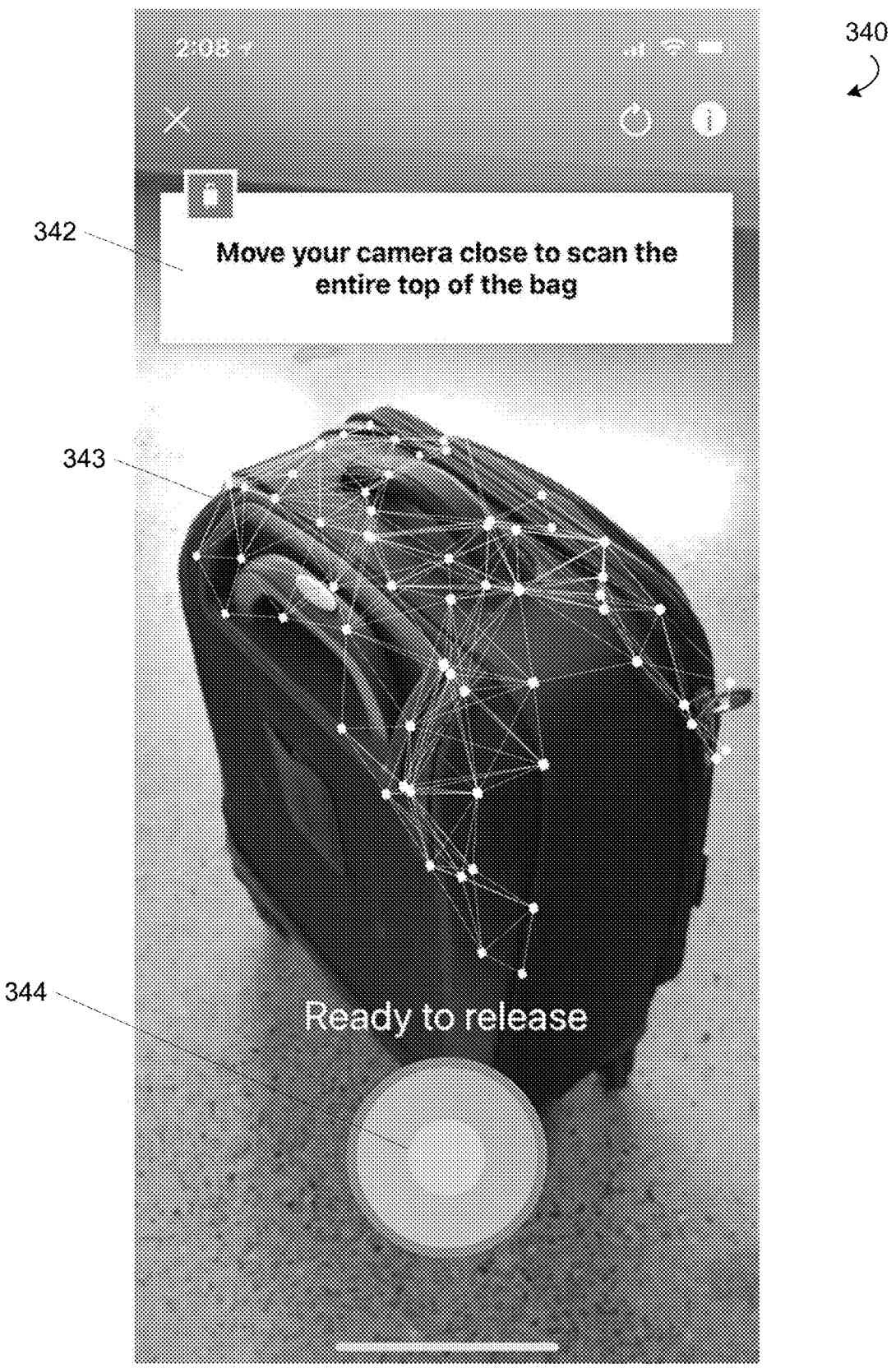
Figure 3J:
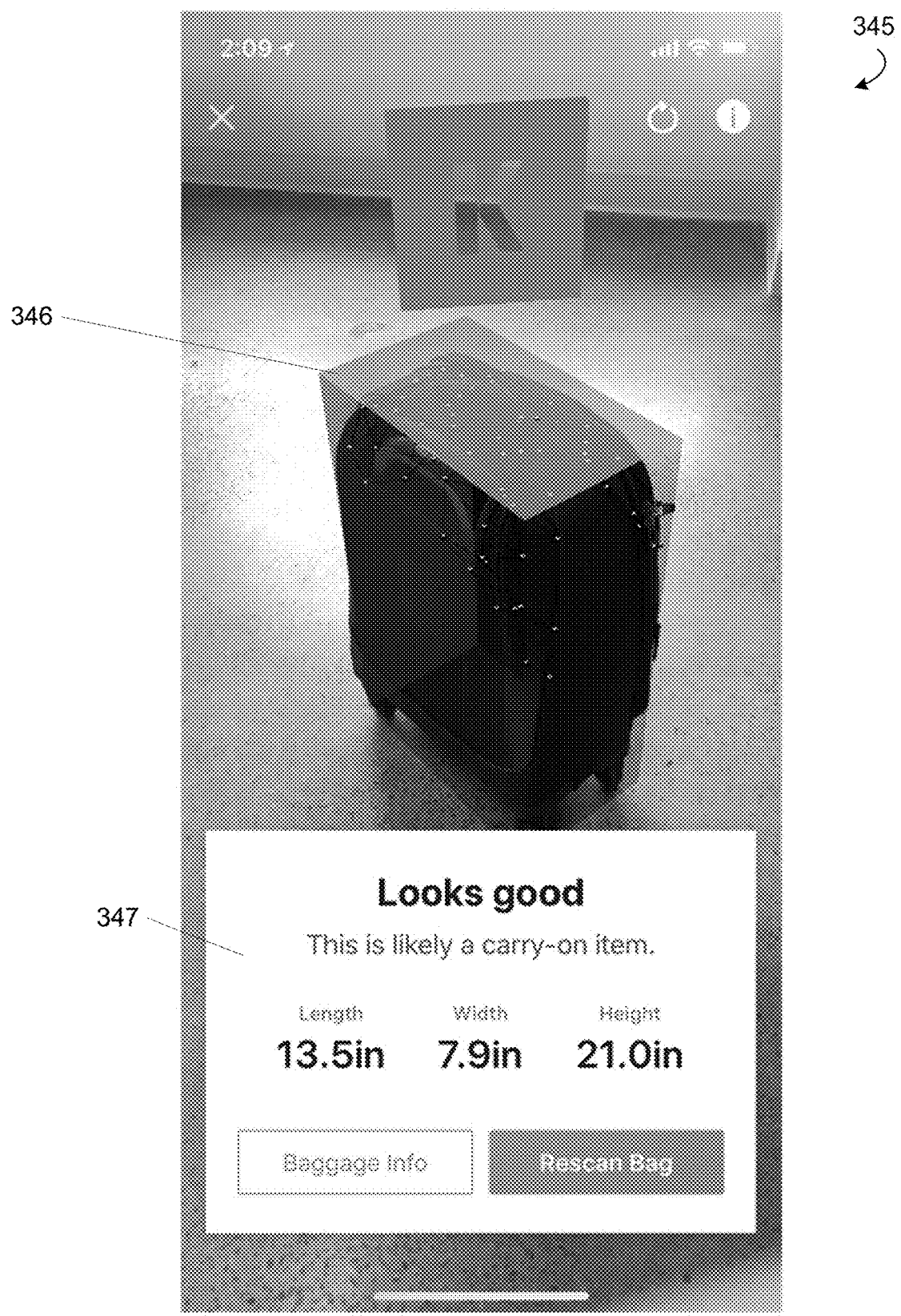
Figure 3K:
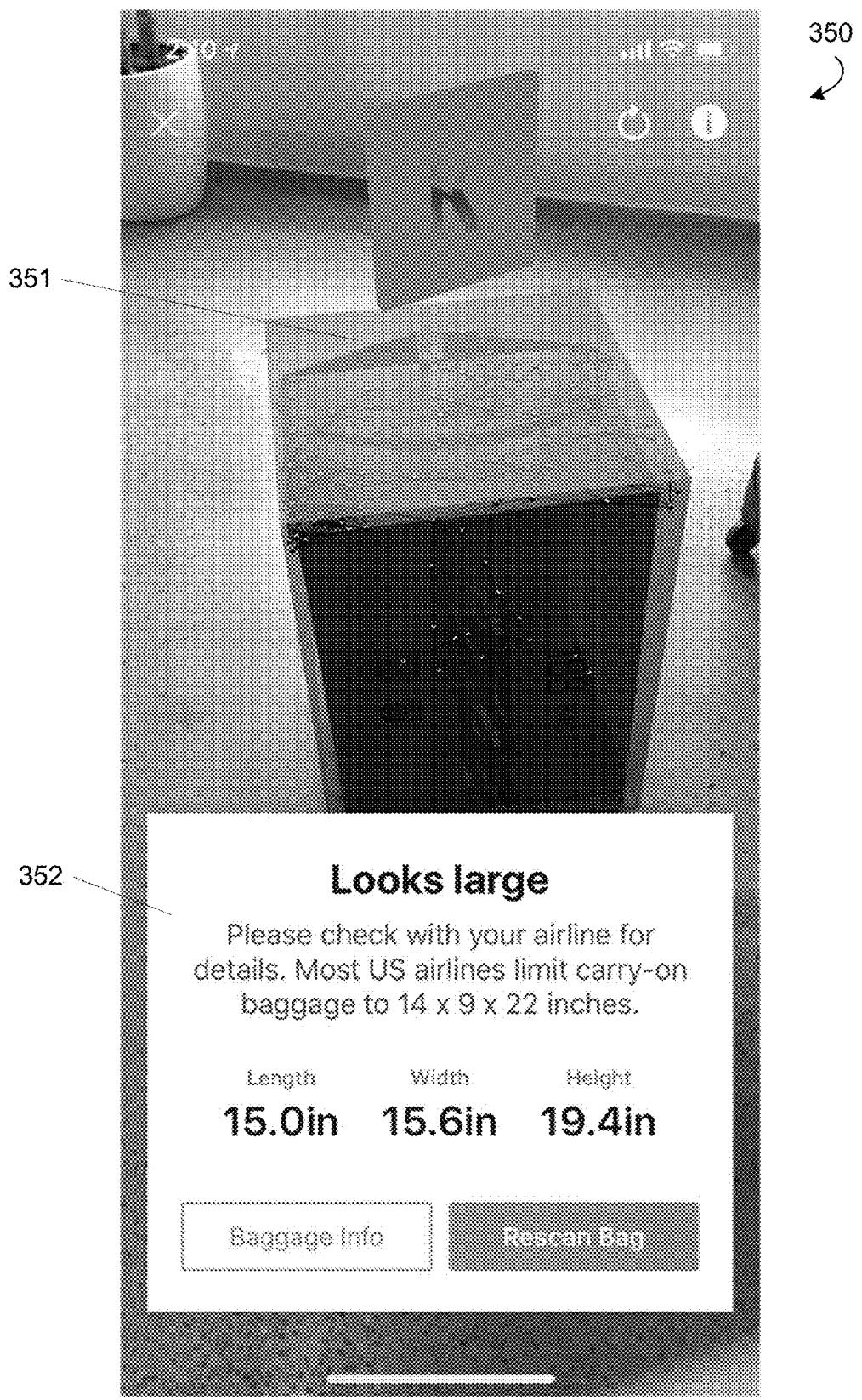
Figure 3L:
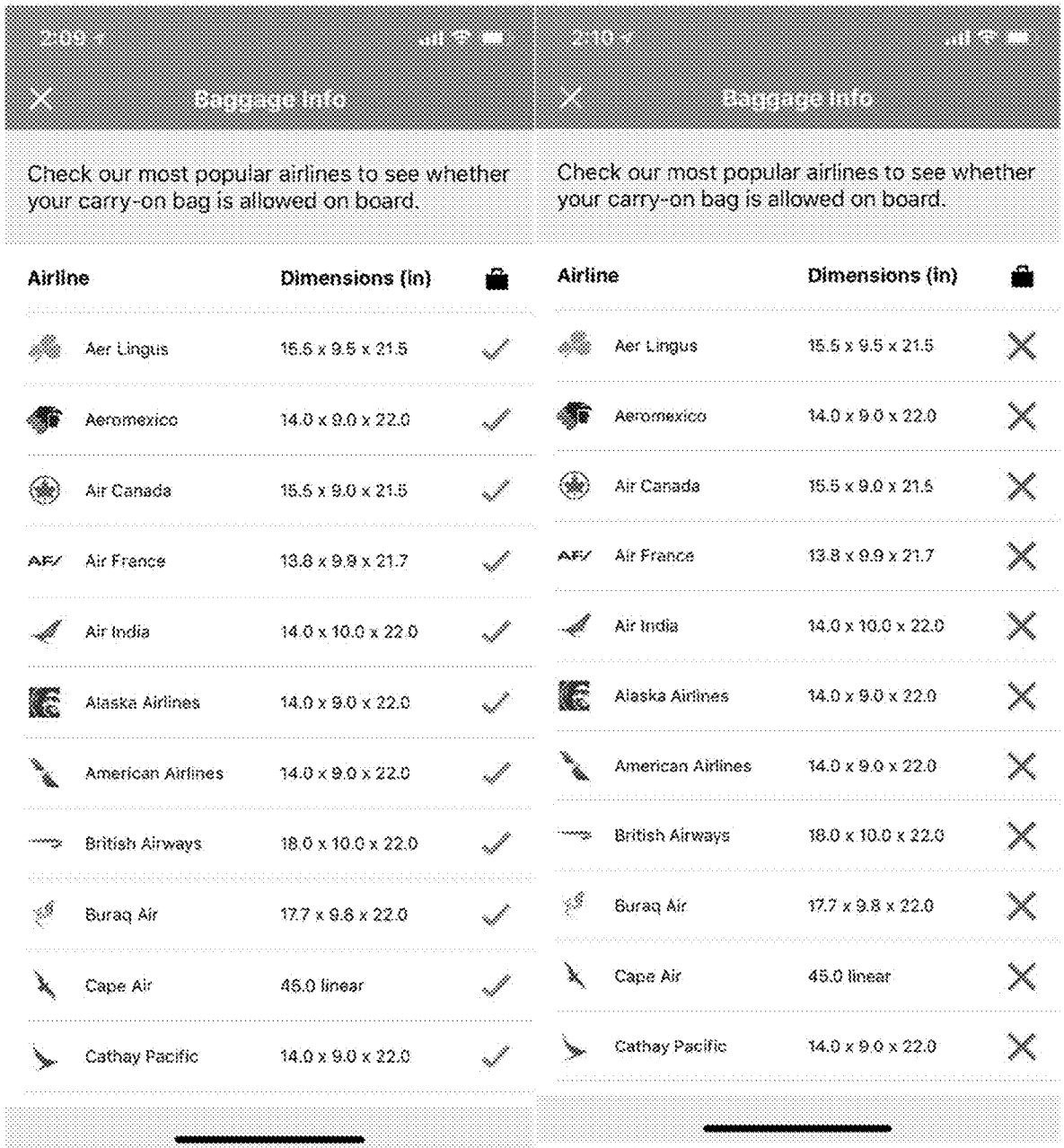
Figure 3M:
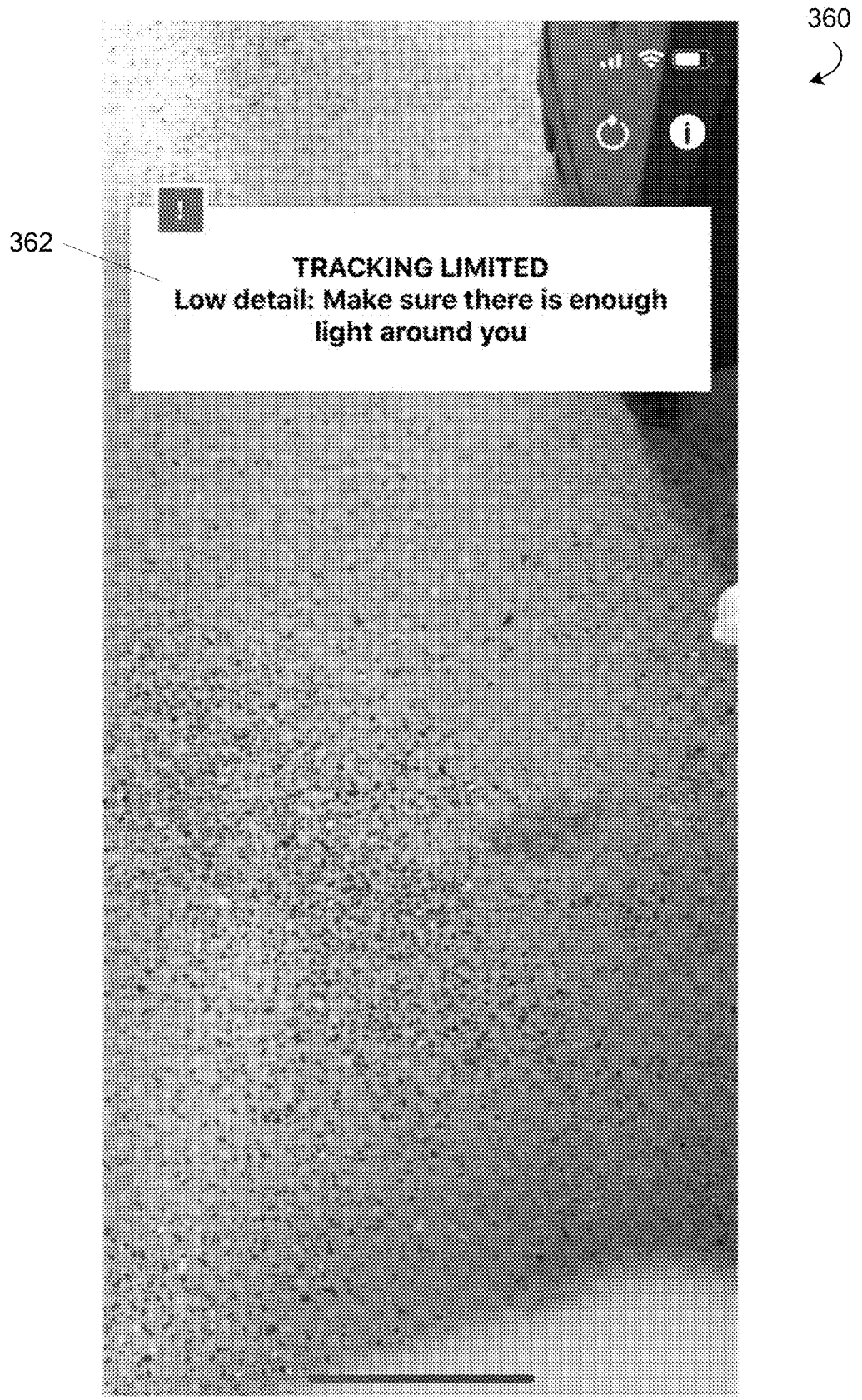

A number of user interfaces can be provided to facilitate a user's ability to capture image data and determine the size of objects. FIGS. 3A-Q illustrate a variety of user interface screenshots for measuring objects, displaying tutorials and other notifications, and a variety of input elements for obtaining input data during the measurement processes described herein in accordance with aspects of the disclosure. Tutorials can be provided to the user in order to provide an overview of the image capturing process. A screenshot 300 showing a tutorial prompt 302 is shown in FIG. 3A. Screenshot 305, shown in FIG. 3B, illustrates a first step in identifying a reference plane with respect to floor 309. Screenshot 310, shown in FIG. 3C, illustrates a prompt for a user to move the camera through space while pointed at the floor 313. Screenshot 315, shown in FIG. 3D, illustrates a grid 318 corresponding to a detected reference plane and a popup 317 prompting a user to click on the grid 318 to confirm the accuracy of the detected reference plane. Object scanning can start when a scan button is pressed, and continue until the scan button is released. Screenshot 320, shown in FIG. 3E, illustrates an object to be scanned 323 and a scan button 324. The scan button 324 includes both a trigger to initiate the scanning of object 323 and a progress meter indicating the confidence in a generated model corresponding to the object 324. This allows the user to easily scan small objects as well as large ones without making any assumptions on when to cut off the scanning. The scanning button can also provide a visual indication regarding the number of feature points identified so that the user is aware of when enough data has been captured. Screenshot 325, shown in FIG. 3F, illustrates a prompt 327 for the user to press and hold the scan button 329 to initiate the object detection process. Screenshot 330, shown in FIG. 3G, illustrates a prompt 332 instructing a user to hold scan button 334 and move the camera in space around object 333. Screenshot 335, shown in FIG. 3H, illustrates a prompt 337 directing the user how to move the camera through space toward object 338. Shown on object 338 are feature points already identified along with a visual indication on scan button 339 indicating how many feature points have been identified. Screenshot 340, shown in FIG. 3I, illustrates a completed scan of object 343 as indicated by scan button 344 having a visual indicator showing sufficient feature points have been identified. Screenshot 345, shown in FIG. 3J, illustrates a successful scan of object 346 and its calculated model along with a confirmation message 347 showing that the object is likely to be sized within a threshold size. Screenshot 350, shown in FIG. 3K, shows a successful scan of object 351 and its calculated model along with a message 352 indicating that the object is likely too large and is outside of a threshold size. Screenshot 355, shown in FIG. 3L, provides an example of airline baggage size requirements and a visual indicator if the measured bag is within the requirements for a given airline. The airline baggage size requirements may be modified to compensate for inaccuracies in the measured object size. This list of airlines may include a combination of a static list of data and/or a dynamic list of airline data retrieved from a server, allowing for an automatic adjustment of the airline list to better identify airlines in which the object will fit. The sizes may be presented in imperial and/or metric units. In several embodiments, overlays of an acceptable baggage size can be superimposed over the detected objects so that users can visualize how close their bags are to the carry-on requirements. User interface 390, shown in FIG. 3Q, includes a dimensional overlay 392 superimposed over object 394. In a number of embodiments, the measured dimensions can be displayed along each edge of the detected object. The dimensional overlay and/or measured dimensions may be toggled on and off.

In a variety of embodiments, the object detection process can proceed without first identifying a reference plane as described herein with respect to FIG. 2B. User interface 370, shown in FIG. 3O, illustrates a popup 372 prompting a user to press and hold scan button 373 and move the camera through space with respect to scene 374 having both a reference plane and an object. User interface 380, shown in FIG. 3P, illustrates a popup 382 prompting a user to move closer to an object in scene 384 while holding scan button 383 to perform object detection.

Informational messages (e.g. popups) can be provided when scanning conditions are not ideal, such as providing a prompt that allows the user to turn on the flashlight on to help with lighting conditions during scanning. Screenshot 360, shown in FIG. 3M, includes a popup 362 indicating that there is insufficient light present to accurately identify a reference plane. Screenshot 380, shown in FIG. 3P, includes a flashlight toggle 385 to activate (or deactivate) a flashlight.

Figure 3N:
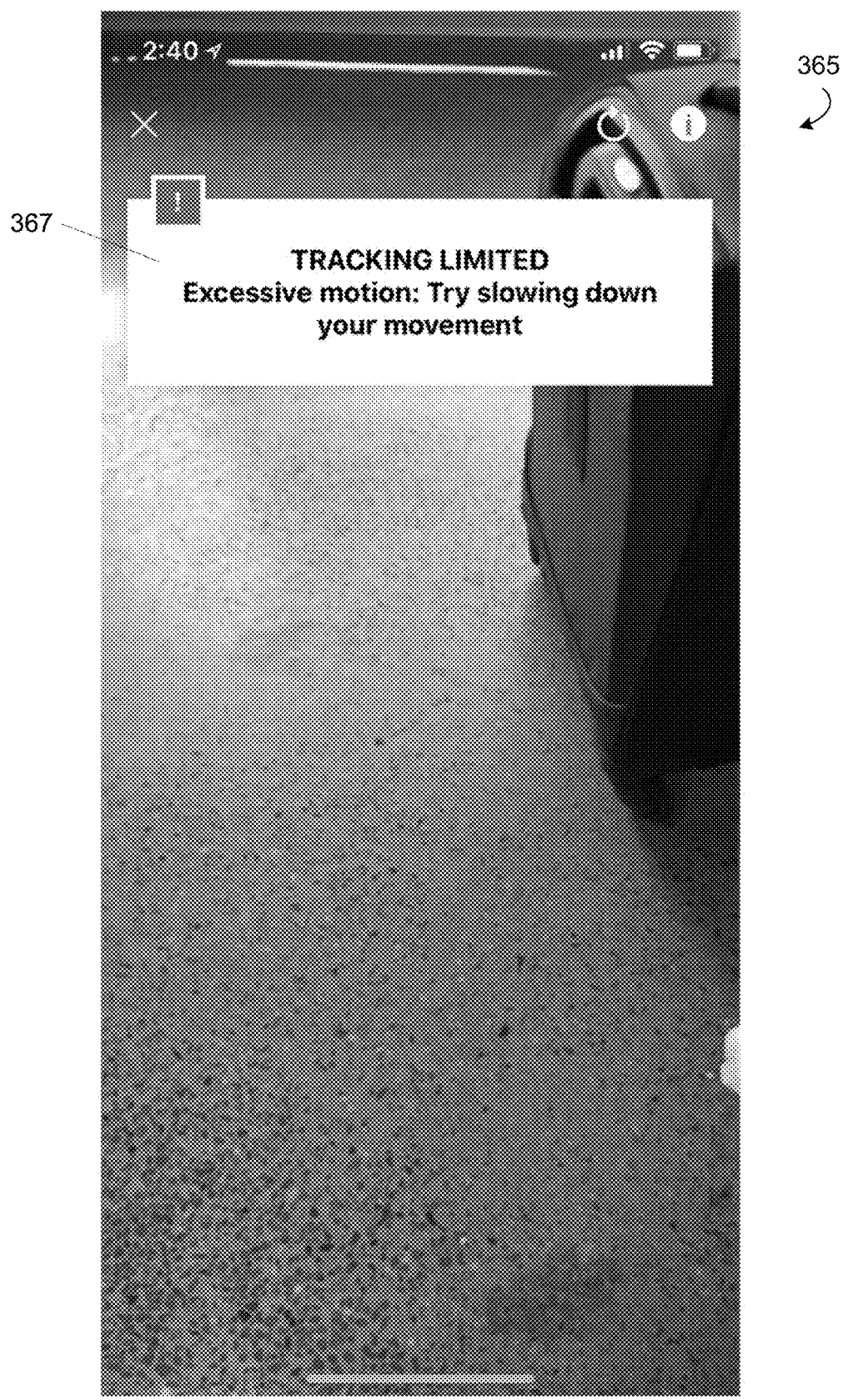
Figure 3O:
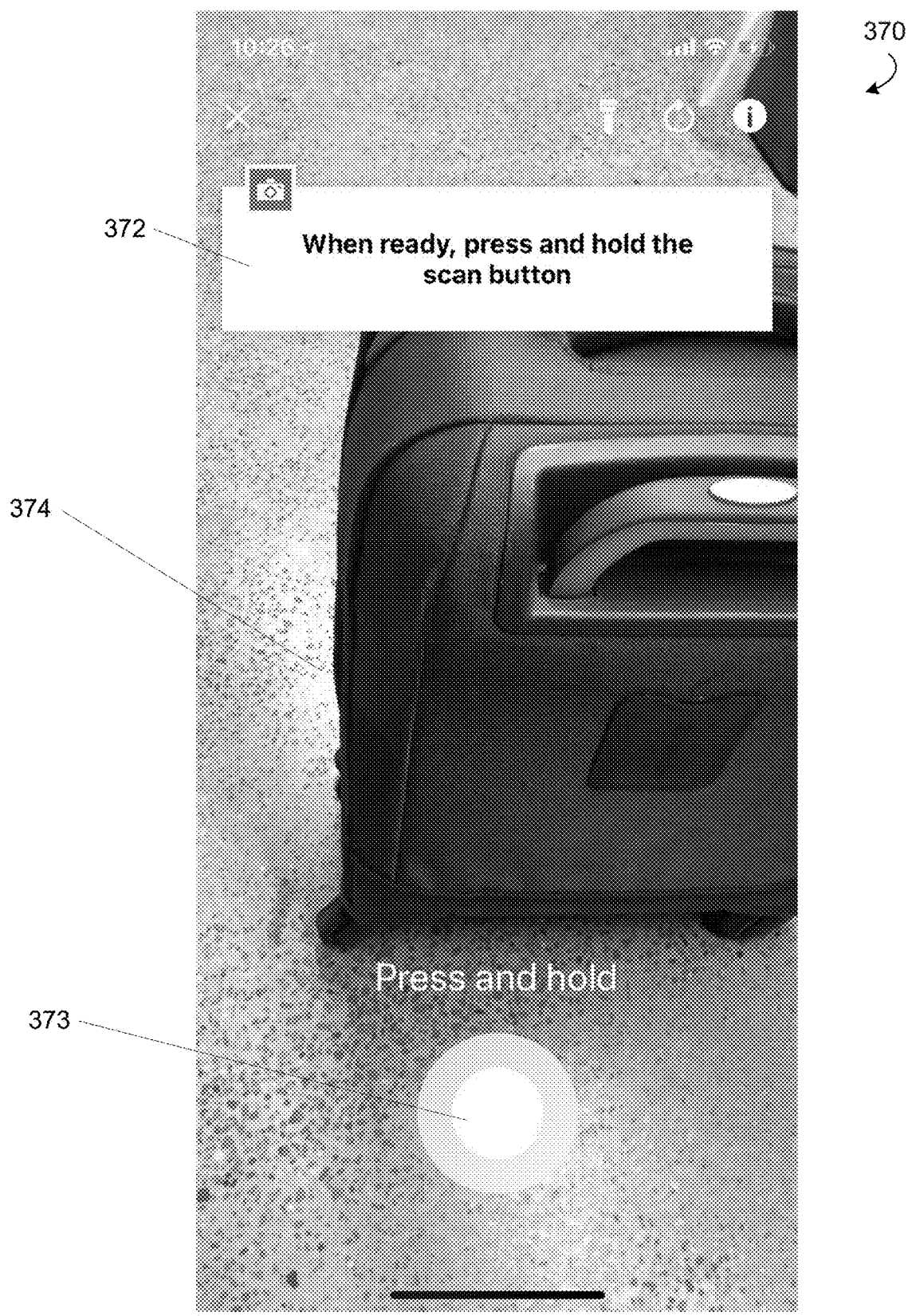
Figure 3P:
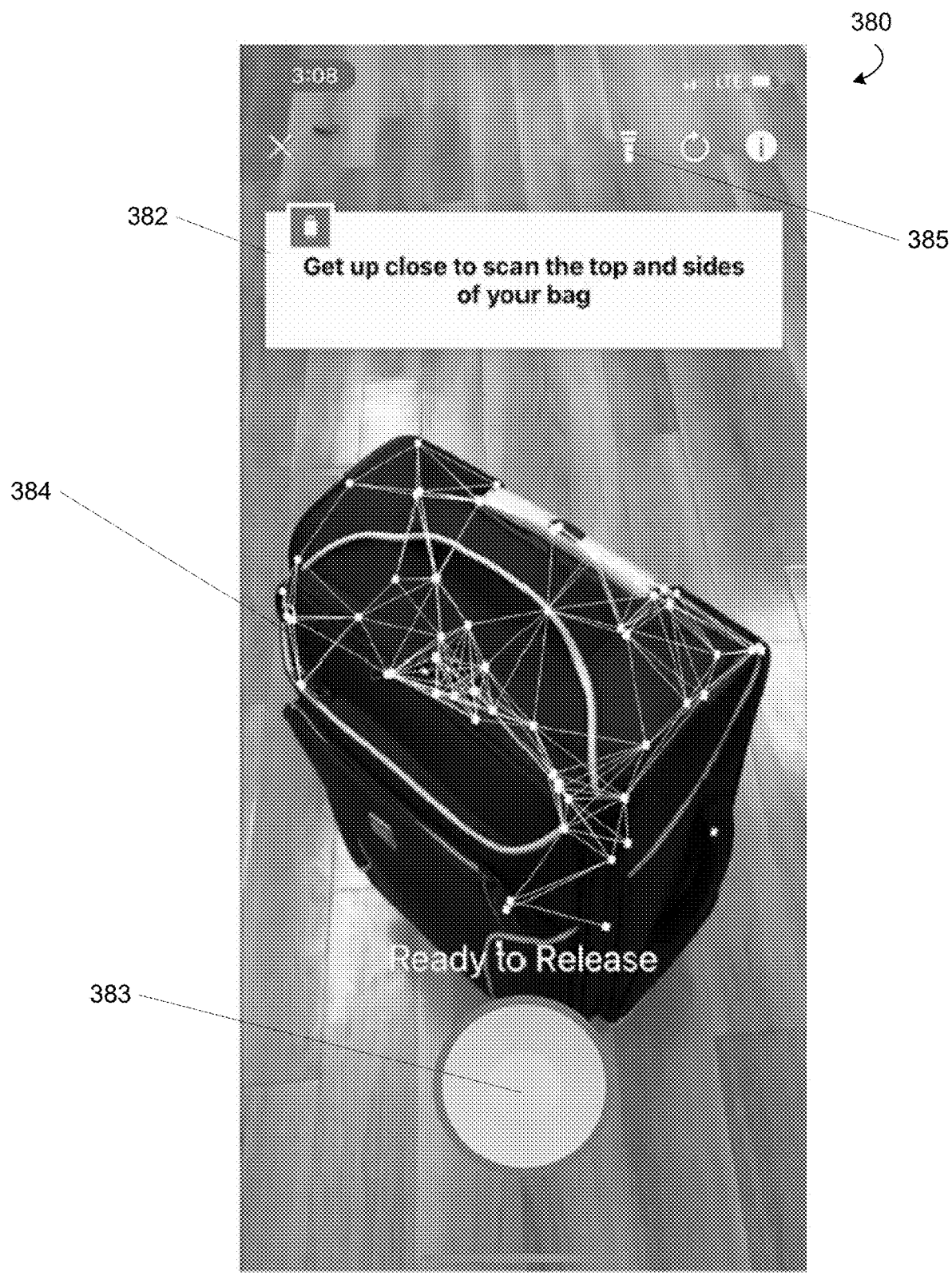
Figure 3Q:
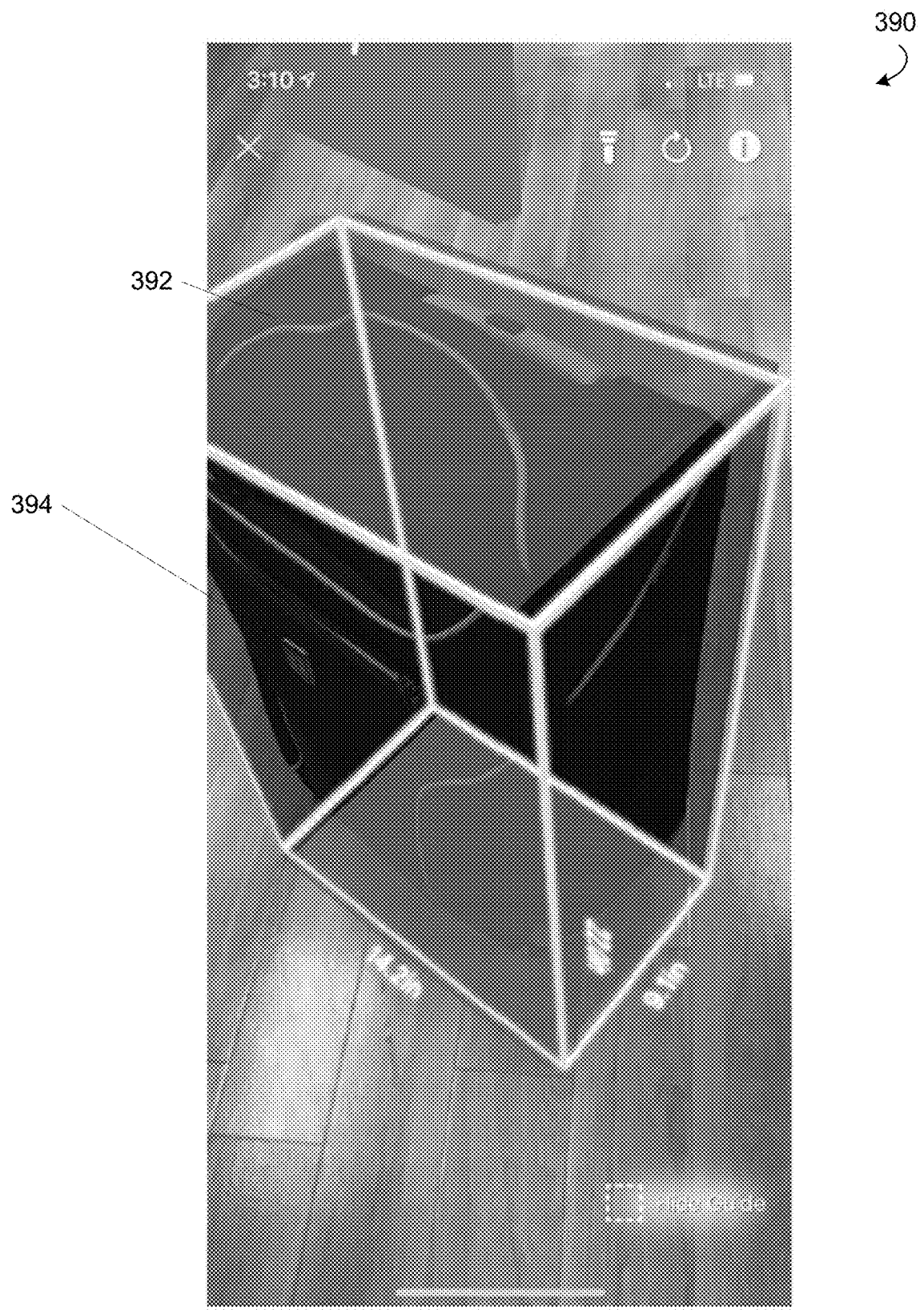

Screenshot 365, shown in FIG. 3N, provides a popup 367 indicating that a user is moving the camera too quickly through space such that feature point detection is impacted. Popups and other informational messages can be dynamically shown in various parts of a display, thereby providing feedback to the user while not obscuring the particular object(s) being captured. Example messages that can be shown in accordance with a variety of embodiments of the invention include popups 307, 312, 317, 322, 327, 332, 337, 342, 347, 352, 362, 367, 372, and 382 shown in FIGS. 3B-K and M-P respectively. In a variety of embodiments, the location of the popups is determined based on the determined reference plane, detected feature points, detected object, or other user interface controls such that the popups have minimal interference with the other objects within the user interface. Information can also be provided to a user after a delay (pre-determined and/or determined dynamically) so that advanced users are not inundated with unnecessary instructions while less-experienced users are provided with feedback in a timely fashion. Users can also be prompted to confirm any of a variety of measured data, such as a reference plane, during the capturing of data. This confirmation can help reduce errors, such as when a desk (or other flat surface) is identified as the reference plane.

A variety of user interfaces for obtaining image data, providing user feedback, and displaying the results of object measurement processes in accordance with a number of embodiments of the invention are shown in and described with respect to FIGS. 3A-Q. However, it should be noted that any of a variety of user interfaces can be utilized as appropriate to the requirements of specific applications of embodiments of the invention.

Computer Systems

The above-described embodiments of the present invention can be implemented in any of numerous ways. For example, the embodiments can be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed function. The one or more controller can be implemented in numerous ways, such as with dedicated hardware, or with specially programmed hardware (e.g., one or more processors) that is programmed using microcode or software to perform the functions described above. Components of the systems described herein can be implemented using a single computer or functionality can be distributed across multiple computers or servers. In distributed settings, communication among system components/modules/interfaces can be realized in any suitable manner (e.g., wired, wireless, network-based connections) as the present disclosures are not limited in this respect.

It should be appreciated that a computer can be embodied in any of numerous forms, such as a rack-mounted computer, a desktop computer, a laptop computer, or a tablet computer. Additionally, a computer can be embodied in any device with suitable processing capabilities, including a Personal Digital Assistant (PDA), a smart phone, or any other suitable portable or fixed electronic device.

A computer system can have one or more input and output devices. These devices can be used, among other things, to present a user interface. Examples of output devices that can be used to provide a user interface include printers or display screens for visual presentation of output, and speakers or other sound generating devices for audible presentation of output. Examples of input devices that can be used for a user interface include keyboards, microphones, and pointing devices, such as mice, touch pads, and digitizing tablets.

Such computers can be interconnected by one or more networks in any suitable form, including a local area network (LAN) or a wide area network (WAN), such as an enterprise network, an intelligent network (IN) or the Internet. Such networks can be based on any suitable technology and can operate according to any suitable protocol and can include wireless networks, wired networks, and/or fiber optic networks.

Figure 4:
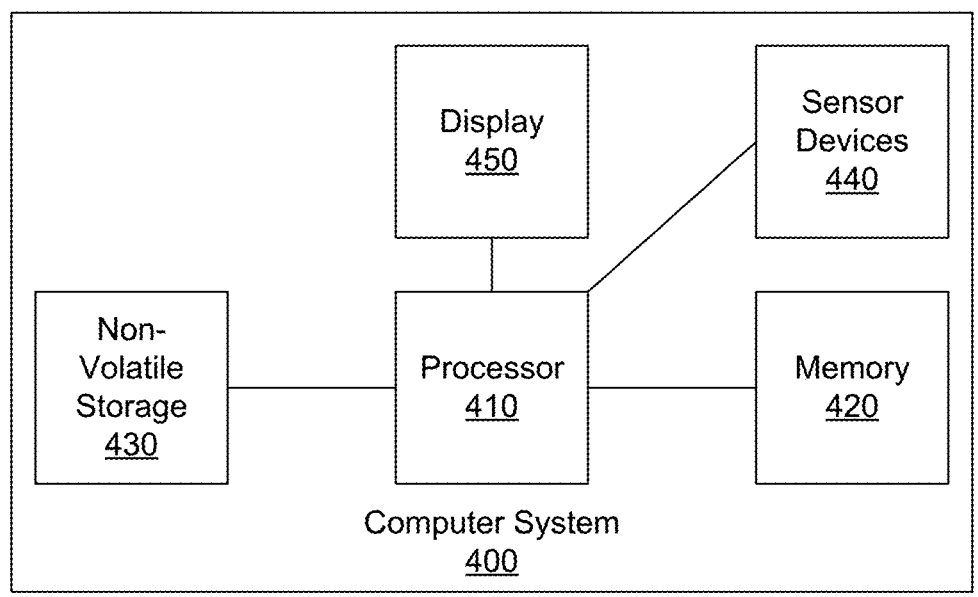
FIG. 4 is a conceptual illustration of a computer system in accordance with an embodiment of the invention.

An illustrative implementation of a computer system 400 that can be used in connection with any of the embodiments described herein is shown in FIG. 4. The computer system 400 can be used as the or one of the computer systems including the travel search service system, computer system and/or the systems of the information sources, and can include one or more processors 410 and one or more non-transitory computer-readable storage media (e.g., memory 420 and/or one or more non-volatile storage media 430). The processor 410 can control writing data to and reading data from the memory 420 and the non-volatile storage device 430 in any suitable manner, as the aspects of the disclosures described herein are not limited in this respect. To perform any of the functionality (including the object measurement processes) described herein, the processor 410 can execute one or more instructions stored in one or more computer-readable storage media (e.g., the memory 420), which can serve as non-transitory computer-readable storage media storing instructions for execution by the processor 410. The computer system 400 can also include a display 450 and one or more sensor devices 440. Sensor devices 440 can include, but are not limited to, cameras, image sensors, accelerometers, location determination devices (such as a global positioning system receiver), infrared sensors, RADAR, LIDAR, acoustic sensors, microphones, light emitting devices, and any other sensors utilized to capture data as appropriate to the requirements of specific applications of the invention. One or more two dimensional image sensors and/or three dimensional image sensors can be utilized as appropriate to the requirements of specific applications of embodiments of the invention.

The various methods or processes, techniques and/or method outlined herein can be coded as software that is executable on one or more processors that employ any one of a variety of operating systems or platforms. Additionally, such software can be written using any of numerous suitable programming languages and/or programming or scripting tools, and can be compiled as executable machine language code or intermediate code that is executed on a virtual machine or a suitable framework.

In this respect, various inventive concepts can be embodied as at least one computer readable storage medium (e.g., a computer memory, one or more floppy discs, hard discs, compact discs, optical discs, magnetic tapes, flash memories, circuit configurations in Field Programmable Gate Arrays, cache, or other semiconductor devices capable of storing data, etc.) encoded with one or more programs that, when executed on one or more computers or other processors, implement the various aspects of the disclosures described herein. The non-transitory computer-readable medium or media can be transportable, such that the program or programs stored thereon can be loaded onto any computer resource to implement various aspects of the disclosures as discussed above. The term computer readable storage medium is used herein to describe any tangible medium capable of storing data, such as the example media mentioned above, but excludes propagating signals and carrier waves, and the term non-transitory computer readable storage medium is co-extensive in this respect.

The terms "program" or "software" are used herein to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but can be distributed in a modular fashion among different computers or processors to implement various aspects of the present disclosure.

Computer-executable instructions can be in many forms, such as program modules, executed by one or more computers or other devices. Generally, program modules include routines, programs, objects, components, data structures, etc. that perform particular tasks or implement particular abstract data types. The functionality of the program modules can be combined or distributed as desired in various embodiments.

Data structures can be stored in non-transitory computer-readable storage media in any suitable form. For simplicity of illustration, data structures can be shown to have fields that are related through location in the data structure. Such relationships can likewise be achieved by assigning storage for the fields with locations in a non-transitory computer-readable medium that convey relationship between the fields. However, any suitable mechanism can be used to establish relationships among information in fields of a data structure, including through the use of pointers, tags or other mechanisms that establish relationships among data elements.

Various inventive concepts can be embodied as one or more methods, of which one or more examples have been provided. The acts performed as part of the method can be ordered in any suitable way. Accordingly, embodiments of the invention can be constructed in which acts are performed in an order differing from those illustrated. This can include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A system, comprising:
    a processor;
    a memory in communication with the processor and storing instructions;
    an input device; and
    an image capture device;
    wherein the instructions, when read by the processor, cause the system to:
        obtain image data using the image capture device in response to input received from the input device indicating that image data should be captured;
        identify a set of feature points within the obtained image data;
        complete the obtaining of the image data based on the set of feature points identified and in response to input received from the input device indicating that image data should no longer be captured;
        generate a model based on the set of feature points;
        measure the generated model with respect to a reference plane to calculate a measured size of the generated model; and
        provide an indication of the measured size of the generated model.

2. The system of claim 1, wherein the instructions, when read by the processor, further cause the system to identify the reference plane prior to obtaining the image data using the image capture device.

3. The system of claim 1, wherein the instructions, when read by the processor, further cause the system to automatically identify the reference plane based on the obtained image data and the set of feature points.

4. The system of claim 1, wherein the input device comprises a touch screen.

5. The system of claim 4, wherein the input device comprises displaying a scan button comprising a trigger area response to a touch input and a visual indication of the set of feature points identified.

6. The system of claim 1, wherein the image capture device comprises a two dimensional image sensor.

7. The system of claim 1, wherein the instructions, when read by the processor, further cause the system to:
    calculate an image sensor correction value based on the image capture device and the obtained image data; and
    generate the model based on the set of feature points and the image sensor correction value.

8. A method, comprising:
    obtaining image data using a device comprising a processor and a memory in communication with the processor;
    identifying a set of feature points within the obtained image data using the device;
    completing the obtaining of the image data based on the set of feature points identified and in response to an indication that image data should no longer be captured using the device;
    generating a model based on the set of feature points using the device;
    measuring the generated model with respect to a reference plane using the device; and
    providing an indication of the measured size of the generated model using the device.

9. The method of claim 8, further comprising identifying the reference plane prior to obtaining the image data using the device.

10. The method of claim 8, further comprising automatically identifying the reference plane based on the obtained image data and the set of feature points using the device.

11. The method of claim 8, wherein the device further comprises a touch screen.

12. The method of claim 11, further comprising displaying, using the touch screen of the device, a scan button comprising a trigger area response to a touch input and a visual indication of the set of feature points identified.

13. The method of claim 8, wherein the device comprises a two dimensional image sensor.

14. The method of claim 8, further comprising:
    calculating, by the device, an image sensor correction value based on the image capture device and the obtained image data; and
    generating, by the device, the model based on the set of feature points and the image sensor correction value.

15. A non-transitory computer-readable medium storing instructions for controlling a processor, the instructions causing the processor to perform steps comprising:
    obtaining image data;
    identifying a set of feature points within the obtained image data;
    completing the obtaining of the image data based on the set of feature points identified and in response to an indication that image data should no longer be captured;
    generating a model based on the set of feature points;
    measuring the generated model with respect to a reference plane; and
    providing an indication of the measured size of the generated model.

16. The non-transitory computer readable medium of claim 15, wherein the instructions further cause the processor to perform steps comprising identifying the reference plane prior to obtaining the image data.

17. The non-transitory computer readable medium of claim 15, wherein the instructions further cause the processor to perform steps comprising automatically identifying the reference plane based on the obtained image data and the set of feature points.

18. The non-transitory computer readable medium of claim 15, wherein the processor is in communication with a touch screen.

19. The non-transitory computer readable medium of claim 18, wherein the instructions further cause the processor to perform steps comprising displaying, using the touch screen, a scan button comprising a trigger area response to a touch input and a visual indication of the set of feature points identified.

20. The non-transitory computer readable medium of claim 15, wherein the instructions further cause the processor to perform steps comprising:
   calculating an image sensor correction value based on the image capture device and the obtained image data; and
   generating the model based on the set of feature points and the image sensor correction value.

* * * * *